US009647919B1

(12) United States Patent
Arguelles (10) Patent No.: US 9,647,919 B1
(45) Date of Patent: May 9, 2017

(54) AUTOMATED DETERMINATION OF MAXIMUM SERVICE THROUGHPUT (71) Applicant: Amazon Technologies, Inc., Reno, NV (US)

(72) Inventor: Carlos Alejandro Arguelles, Shoreline, WA (US)

(73) Assignee: Amazon Technologies, Reno, NV (US)

( * ) Notice: Subject to any disclaimer, the term of this patent is extended or adjusted under 35 U.S.C. 154(b) by 121 days.

(21) Appl. No.: 14/561,170

(22) Filed: Dec. 4, 2014

(51) Int. Cl.
H04L 12/26 (2006.01)
G06F 11/36 (2006.01)
H04L 12/24 (2006.01)
G06F 11/30 (2006.01)

(52) U.S. Cl.
CPC ...... *H04L 43/0888* (2013.01); *G06F 11/3072* (2013.01); *G06F 11/3676* (2013.01); *G06F 11/3684* (2013.01); *H04L 41/12* (2013.01)

(58) Field of Classification Search
None
See application file for complete search history.

(56) References Cited

U.S. PATENT DOCUMENTS

| 6,110,214 A * | 8/2000 | Klimasauskas | G05B 13/027 700/30 |
| 6,963,828 B1 * | 11/2005 | McDonald | G06F 9/5061 703/1 |
| 7,640,236 B1 * | 12/2009 | Pogue | G06F 17/30867 |
| 7,756,989 B2 | 7/2010 | Goldszmidt et al. | |
| 8,095,486 B2 * | 1/2012 | Chen | G06F 9/44505 703/2 |
| 8,856,376 B1 * | 10/2014 | Watson | G06F 11/3419 370/230 |
| 9,037,922 B1 * | 5/2015 | Cabrera | G06F 11/07 714/47.1 |
| 9,053,070 B1 * | 6/2015 | Arguelles | G06F 15/177 |
| 9,130,839 B1 * | 9/2015 | Krzanowski | H04L 43/0882 |
| 9,317,812 B2 * | 4/2016 | Kabiljo | G06N 99/005 |
| 2007/0083630 A1 * | 4/2007 | Roth | G06F 11/3688 709/223 |
| 2009/0037132 A1 * | 2/2009 | Zhou | G01R 31/31907 702/119 |
| 2010/0198960 A1 * | 8/2010 | Kirschnick | G06F 11/3414 709/224 |

(Continued)

*Primary Examiner* — Jeffrey M Rutkowski
*Assistant Examiner* — Jonathan B Wood
(74) *Attorney, Agent, or Firm* — Robert C. Kowert; Meyertons, Hood, Kivlin, Kowert & Goetzel, P.C.

(57) ABSTRACT

Methods, systems, and computer-readable media for determining the maximum throughput of a service are disclosed. A first sequence of load tests is initiated for a service host. Individual ones of the load tests comprise determining a respective throughput at the service host for a respective number of concurrent connections to the service host. The number of concurrent connections increases nonlinearly in at least a portion of the first sequence of load tests. The first sequence of load tests is discontinued when the throughput is not increased by a threshold from one of the load tests to the next. An estimated maximum throughput for the service host is determined based at least in part on the first sequence of load tests. The estimated maximum throughput corresponds to a particular number of concurrent connections to the service host.

18 Claims, 7 Drawing Sheets (56) References Cited

U.S. PATENT DOCUMENTS

| | | | |
|---|---|---|---|
| 2010/0232344 A1* | 9/2010 | Kim | H04L 5/0007 370/315 |
| 2012/0053894 A1* | 3/2012 | Macik | G06F 11/3414 702/176 |
| 2012/0124559 A1* | 5/2012 | Kondur | G09B 7/02 717/125 |
| 2012/0131554 A1* | 5/2012 | Mueller | G06F 11/3664 717/124 |
| 2014/0153419 A1* | 6/2014 | Beattie, Jr. | H04W 24/10 370/252 |
| 2014/0245264 A1* | 8/2014 | Bartley | G06F 8/70 717/124 |
| 2014/0289561 A1* | 9/2014 | Majumdar | G06F 11/263 714/32 |
| 2014/0307583 A1* | 10/2014 | Urgaonkar | H04W 16/10 370/254 |
| 2015/0095619 A1* | 4/2015 | Dubey | G06F 11/3688 712/216 |
| 2015/0109937 A1* | 4/2015 | Wang | H04L 43/50 370/241 |
| 2015/0149418 A1* | 5/2015 | Ghodsnia | G06F 17/30306 707/688 |
| 2015/0309918 A1* | 10/2015 | Raghavan | G06F 11/3684 714/38.1 |
| 2016/0092765 A1* | 3/2016 | Chilimbi | H04L 67/10 706/25 |

* cited by examiner

AUTOMATED DETERMINATION OF MAXIMUM SERVICE THROUGHPUT

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in varied ways.

Tuning the configuration of a service on a computer system is typically a manual process. In other words, a tuning process typically involves a user manually tweaking different attributes of the service or the underlying system in the hopes of improving the performance of the system running the service. Multiple attributes may need to be manually modified many times in an effort to improve the performance significantly, especially if performance is dependent on multiple interrelated attributes. For heterogeneous multi-host web services that have specific targets in terms of throughput, latency, or stability, the tuning process may be especially complex and time-consuming.

A typical approach to this manual tuning process involves trial and error. A user may making some initial guesses on optimal values, test the service based on the guesses, and manually analyze the resulting performance. The user may then tweak the values even further, again based on guesswork. In some circumstances, parts of the system will change dramatically over time, thus making the original estimates outdated. However, because this approach to tuning is manual and time-consuming, the tuning may not be performed on a regular basis. As a result, outdated and inefficient settings may remain in place until they have significantly adverse effects on performance. When performance estimates are outdated or entirely absent, hardware resources may be wasted on systems that are not operating optimally.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for automated determination of maximum service throughput are described. Using the techniques described herein, automated tuning of a service may be performed to determine the maximum throughput of the service as well as the maximum connections associated with the maximum throughput. The automated tuning may include a first sequence of load tests in which load is generated for the service using a variable number of concurrent connections to the service. The number of concurrent connections may increase nonlinearly throughout the sequence, e.g., by doubling with every load test in the sequence. The first sequence of load tests may be halted when the increase in concurrent connections no longer produces an increase in throughput, e.g., as measured by successful transactions per second processed by the service. The first set of load tests may determine a range of values for the maximum throughput, and a second sequence of load tests may search within the range of values to determine the maximum throughput. In the second sequence of load tests, the number of concurrent connections may increase or decrease from load test to load test, e.g., as long as the change produces an increase in throughput. The resulting values for the maximum throughput and maximum connections may be used to optimize the configuration of a fleet of service hosts and/or a load balancer for the service hosts.

Figure 1:
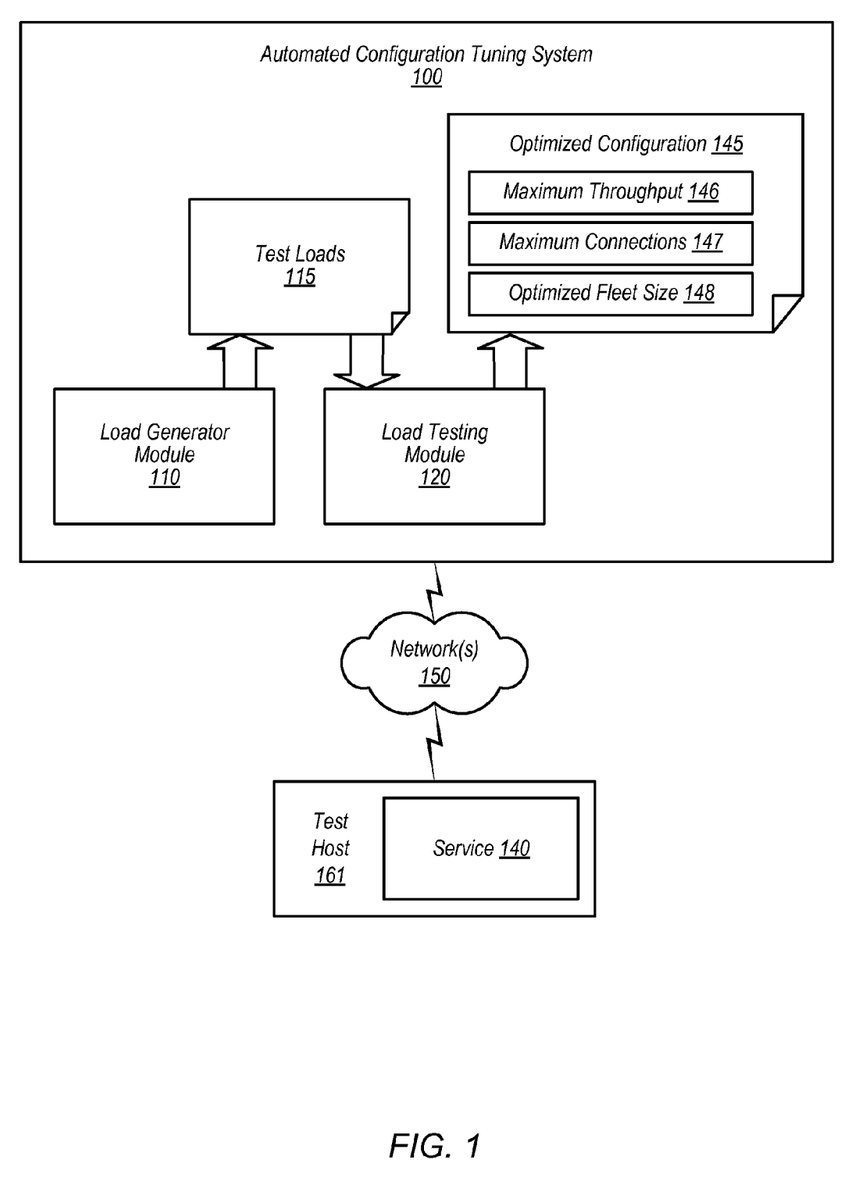
FIG. 1 illustrates an example system environment for automated determination of maximum service throughput, according to one embodiment.

FIG. 1 illustrates an example system environment for automated determination of maximum service throughput, according to one embodiment. The example system environment may comprise an automated configuration tuning system 100. The automated configuration tuning system 100 may include various modules such as a load generator module 110 and a load testing module 120. The automated configuration tuning system 100 may comprise one or more computing devices, any of which may be implemented by the example computing device 3000 illustrated in FIG. 7. In various embodiments, the functionality of the different modules (e.g., load generator module 110 and load testing module 120) may be provided by the same computing device or by different computing devices. If any of the load generator module 110 and load testing module 120 are implemented using different computing devices, then the modules and their respective computing devices may be communicatively coupled, e.g., via a network. Each of the load generator module 110 and load testing module 120 may represent any combination of software and hardware usable to perform their respective functions, as discussed as follows. Operations implemented by the load generator module 110 and/or load testing module 120 may be performed automatically, e.g., without a need for user initiation or user intervention after an initial configuration stage, and programmatically, e.g., by execution of program instructions on a computing device.

The load generator module 110 may generate a plurality of test loads 115 for use in the load testing of a service 140. For example, if the service 140 is associated with an electronic commerce (e-commerce) merchant, then the service may be configured to perform one or more suitable operations such as generating a web page (e.g., a product description page for a product offered for sale by the merchant), completing a sale or other transaction between the merchant and a customer, verifying a payment presented by the customer, etc. Each test load may comprise data, such as service requests, associated with a plurality of transactions or other operations that are processed by the service 140. The test loads may be generated by sampling actual production transactions or by generating synthetic transactions.

The service 140 may be configured to perform one or more functions upon receiving a suitable request. For example, the service 140 may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. The service 140 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, the service 140 may be configured to perform any of a variety of business processes.

The service 140 may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

Figure 7:
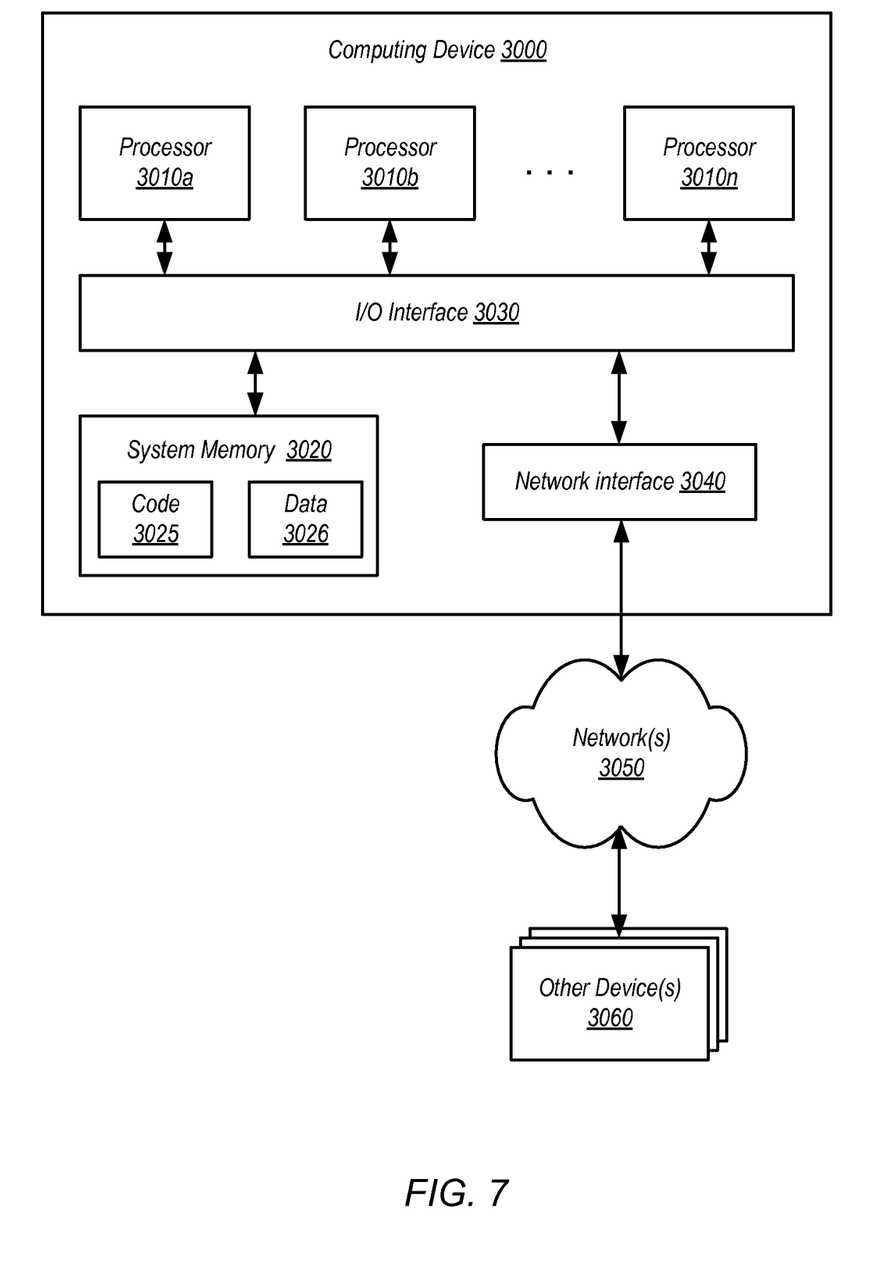
FIG. 7 illustrates an example computing device that may be used in some embodiments.

The automated configuration tuning system 100 may be communicatively coupled to one or more other computer systems, any of which may be implemented by the example computing device 3000 illustrated in FIG. 7, over one or more network(s) 150. In one embodiment, the automated configuration tuning system 100 may be communicatively coupled to a test host 161. Software implementing the service 140 may be installed on, and executed by, the test host 161. In one embodiment, the automated configuration tuning system 100 may interact with one or more service hosts in any suitable environment, such as a production environment and/or a test environment. The production environment may be a "real-world" environment in which a set of production services are invoked, either directly or indirectly, by interactions with a real-world client, consumer, or customer, e.g., of an online merchant or provider of web-based services. In one embodiment, the test environment may be an environment in which a set of test services are invoked in order to test their functionality. The test environment may be isolated from real-world clients, consumers, or customers of an online merchant or provider of web-based services. In one embodiment, the test environment may be implemented by configuring suitable elements of computing hardware and software in a manner designed to mimic the functionality of the production environment. In one embodiment, the test environment may temporarily borrow resources from the production environment. In one embodiment, the test environment may be configured to shadow the production environment, such that individual test services represent shadow instances of corresponding production services. When the production environment is run in shadow mode, copies of requests generated by production services may be forwarded to shadow instances in the test environment to execute the same transactions.

To determine an optimized configuration 145 for the service 140, the load testing module 120 may use the test loads 115 to perform load tests using the test host 161. The load testing module 120 may be configured to measure the throughput achieved for a particular load test, e.g., by determining the transactions per second successfully processed by the service. The load testing module 120 may be configured to measure the latency of each transaction as well as percentile statistics for latency. Additionally, the load testing module 120 may be configured to determine the number of transactions that passed and the number of transactions that failed.

In one embodiment, the optimized configuration 145 determined by the load testing module 120 may include a maximum throughput 146, e.g., as measured in successful transactions per second. As used herein, the term "maximum throughput" may indicate a value that is not necessarily an exact maximum but rather an estimate or approximation of a suitably high value for the throughput of a service. In one embodiment, the optimized configuration 145 may include a maximum number of concurrent connections 147 that the test host 161 can handle when providing the maximum throughput. As used herein, the term "maximum number of concurrent connections" may indicate a value that is not necessarily an exact maximum but rather an estimate or approximation of a suitably high value for the number of concurrent connections to a service. In one embodiment, the optimized configuration 145 may include an optimized number of service hosts 148 to implement the service 140. For example, for services that scale linearly for multiple hosts, the optimized number of service hosts may be determined by dividing the anticipated peak traffic by the maximum throughput for the individual host 161.

In many circumstances, the throughput of a service may increase up to a point as the number of concurrent connections increase. In other words, two concurrent connections generating transactions back to back may achieve a higher throughput than a single connection generating transactions back to back. However, at some point an increase in the number of concurrent connections may be counter-productive, as transactions begin to fail or take too long.

In one embodiment, the load testing module 120 may perform a first sequence of load tests in which load is generated for the service using a variable number of concurrent connections to the service. The number of concurrent connections may increase nonlinearly throughout the sequence, e.g., by doubling with every load test in the sequence. The period of time for each load test may be configurable by a user. In one embodiment, a cooldown period between load tests or iterations in a sequence may also be configurable. In one embodiment, the first sequence of load tests may be halted when the increase in concurrent connections no longer produces an increase in throughput, e.g., as measured by successful transactions per second (or other time period) processed by the service. In one embodiment, the first sequence of load tests may be halted when the increase in concurrent connections no longer produces an increase in throughput beyond a desired threshold. The success or failure of transactions over a period of time and the resulting throughput metric may be determined by the load testing module 120. The success or failure of transactions may be determined based on a response code generated by the service and/or a timeout value for such a response. Additionally, the success or failure of transactions may be determined based on compliance with any applicable service-level agreements (SLAs). In one embodiment, other ending conditions for the first sequence of load tests may be specified by a user. For example, the load tests may be terminated automatically when a particular threshold for a particular performance metric is reached (e.g., when CPU utilization exceeds 80%) or when the error rate exceeds a particular threshold.

The first set of load tests may determine a range of values for the maximum throughput. In one embodiment, a second sequence of load tests may search within the range of values to determine the maximum throughput. In the second sequence of load tests, the number of concurrent connections may increase or decrease from load test to load test, e.g., as long as the changes produce an increase in throughput. In one embodiment, the number of concurrent connections may oscillate up and down within the range of values until the maximum throughput is found. In one embodiment, the search within the range of values may continue only if the increase in throughput from one iteration to the next is greater than a desired percentage.

In one embodiment, the resulting value for the maximum throughput may be used to optimize the configuration of a fleet of service hosts. For example, an optimized size of the fleet may be determined based on the maximum throughput. In one embodiment, for services that scale linearly for multiple hosts, the optimized number of service hosts may be determined by dividing the anticipated peak traffic by the maximum throughput for an individual service host. The anticipated peak traffic may be determined using any suitable technique(s). The fleet of hosts may be automatically configured with optimized size by provisioning one or more additional service hosts and/or deprovisioning one or more existing service hosts. In one embodiment, an auto-scaler may be used to optimize the fleet size by provisioning and/or deprovisioning hosts. The auto-scaler may automatically provision one or more hosts from a pool of available compute instances or automatically return one or more hosts to the pool of compute instances.

In one embodiment, a fleet of hosts that implement the service 140 may sit behind a load balancer that directs requests to individual hosts. The resulting value for the maximum connections may be used to optimize the configuration of the load balancer for a fleet of service hosts. In one embodiment, the "maximum connections" parameter of the load balancer may be assigned the value for the maximum connections as determined by the load testing module 120.

In one embodiment, the load testing module 120 may operate to determine the maximum throughput and maximum connections in an automated manner. For example, the automated determination of maximum service throughput may be performed upon checkin of a new build of a service or otherwise when the program code of a service is changed. In one embodiment, the automated determination of maximum service throughput may be performed periodically or regularly based on a schedule.

Figure 2:
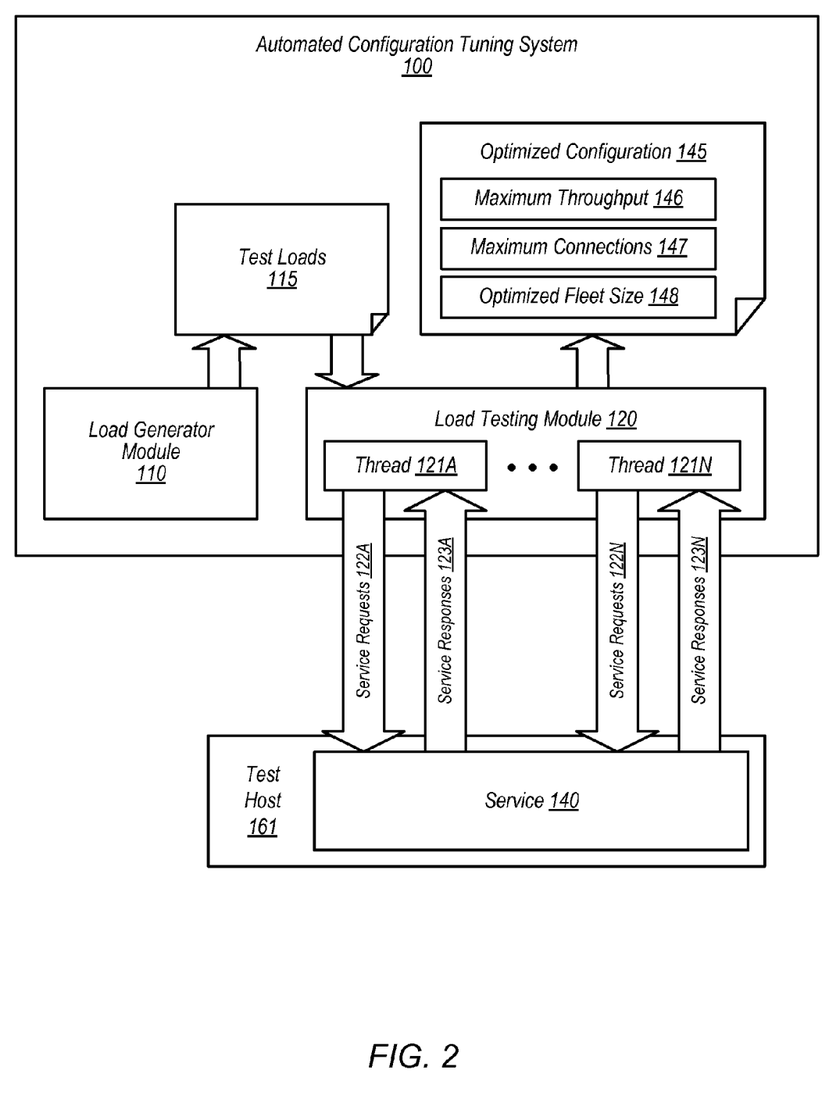
FIG. 2 illustrates further aspects of the example system environment for automated determination of maximum service throughput, according to one embodiment.

FIG. 2 illustrates further aspects of the example system environment for automated determination of maximum service throughput, according to one embodiment. As discussed above, the number of concurrent connections to the service 140 may vary from load test to load test in a sequence of load tests. For example, the number of concurrent connections may increase from load test to load test in a first sequence, and the number of concurrent connections may increase or decrease from load test to load test in a second sequence. In one embodiment, the load testing module 120 may use one thread per connection to the service 140. As shown in FIG. 2, for example, the load testing module 120 may include a plurality of threads such as thread 121A through thread 121N. Although two threads 121A-121N are shown for purposes of example, it is contemplated that any suitable number of threads may be used by the load testing module 120 for applying load to a service 140 at a test host 161. Each of the threads 121A-121N may establish a respective connection to the service 140 using any suitable communications protocol(s) and/or application programming interface(s) (API(s)). Each of the threads 121A-121N may send service requests to the service 140 and receive service responses from the service. As shown in FIG. 2, for example, the thread 121A may send service requests 122A and receive service responses 123A, and the thread 121N may send service requests 122N and receive service responses 123N.

Figure 3:
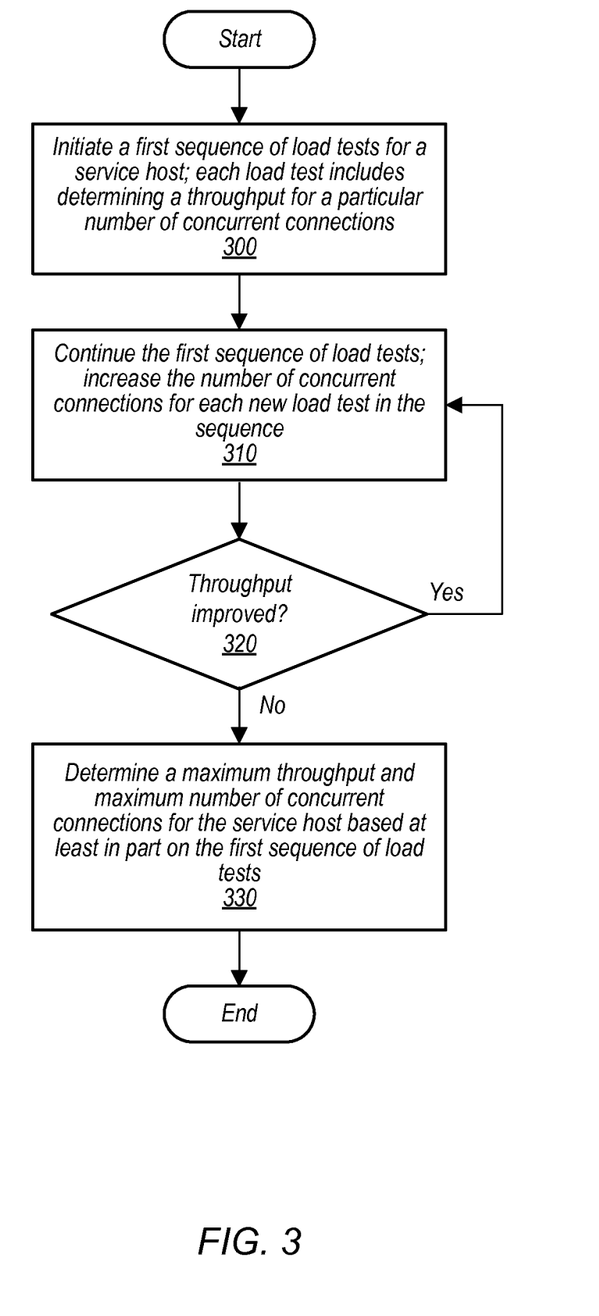
FIG. 3 is a flowchart illustrating a method for automated determination of maximum service throughput, according to one embodiment.

FIG. 3 is a flowchart illustrating a method for automated determination of maximum service throughput, according to one embodiment. As shown in 300, a first sequence of load tests may be initiated for a service host (e.g., a host that implements a particular service). Each load test may include applying load to the service for a period of time using a particular number of concurrent connections to the service, e.g., by sending service requests to the service. The load test may determine one or more performance metrics of the service host and/or service, such as throughput. The throughput may be measured as the number of successful transactions processed by the service per unit of time (e.g., per second). Any suitable technique(s) may be used to determine the throughput or other metrics, such as analysis of the responses from the service. The conditions that determine the success or failure of a transaction may be configurable by a user. The operation shown in 300 may represent at least one load test or iteration using an initial number of concurrent connections, such as 1 connection.

As shown in 310, the first sequence of load tests may continue with one or more additional load tests or iterations. The number of concurrent connections may be increased from load test to load test or iteration to iteration. In one embodiment, the number of concurrent connections may be increased nonlinearly in the first sequence. For example, the number of concurrent connections may be doubled from load test to load test or iteration to iteration. Again, each load test may include applying load to the service for a period of time using a particular number of concurrent connections to the service and determining the throughput achieved by the service for the particular number of concurrent connections. Accordingly, the operation shown in 310 may represent at least one load test using a number of concurrent connections greater than the previous load test.

As shown in 320, it may be determined whether the throughput achieved in the most recent load test or iteration represents an improvement over the throughput achieved in the previous load test or iteration, i.e., in comparison to the load test or iteration immediately preceding the most recent one. If the throughput was improved, then the method may continue with another load test or iteration at a higher number of concurrent connections, as shown in 310. If the throughput was the same or decreased, then the first sequence of load tests may be discontinued or halted. In one embodiment, it may be determined whether the latest throughput metric represents an improvement by a particular predetermined threshold, such as a percentage increase. For example, if the threshold is a 3% improvement, then the first sequence of load tests may be discontinued if the most recent load test represents only a 2% improvement in throughput.

As shown in 330, aspects of the optimized configuration of the service may be determined after the first sequence of load tests is finished. For example, the estimated maximum throughput of the service may be determined, e.g., based on the first sequence of load tests. The estimated maximum number of concurrent connections that the service can handle may also be determined. In one embodiment, the estimated maximum number of concurrent connections may be determined as the number of concurrent connections used in the load test having the estimated maximum throughput. In one embodiment, the estimated maximum throughput and estimated maximum number of concurrent connections may be determined based at least in part on the first sequence of load tests. As will be discussed in greater detail below, a second sequence of load tests may also be used to determine the estimated maximum throughput and estimated maximum number of concurrent connections.

Figure 4:
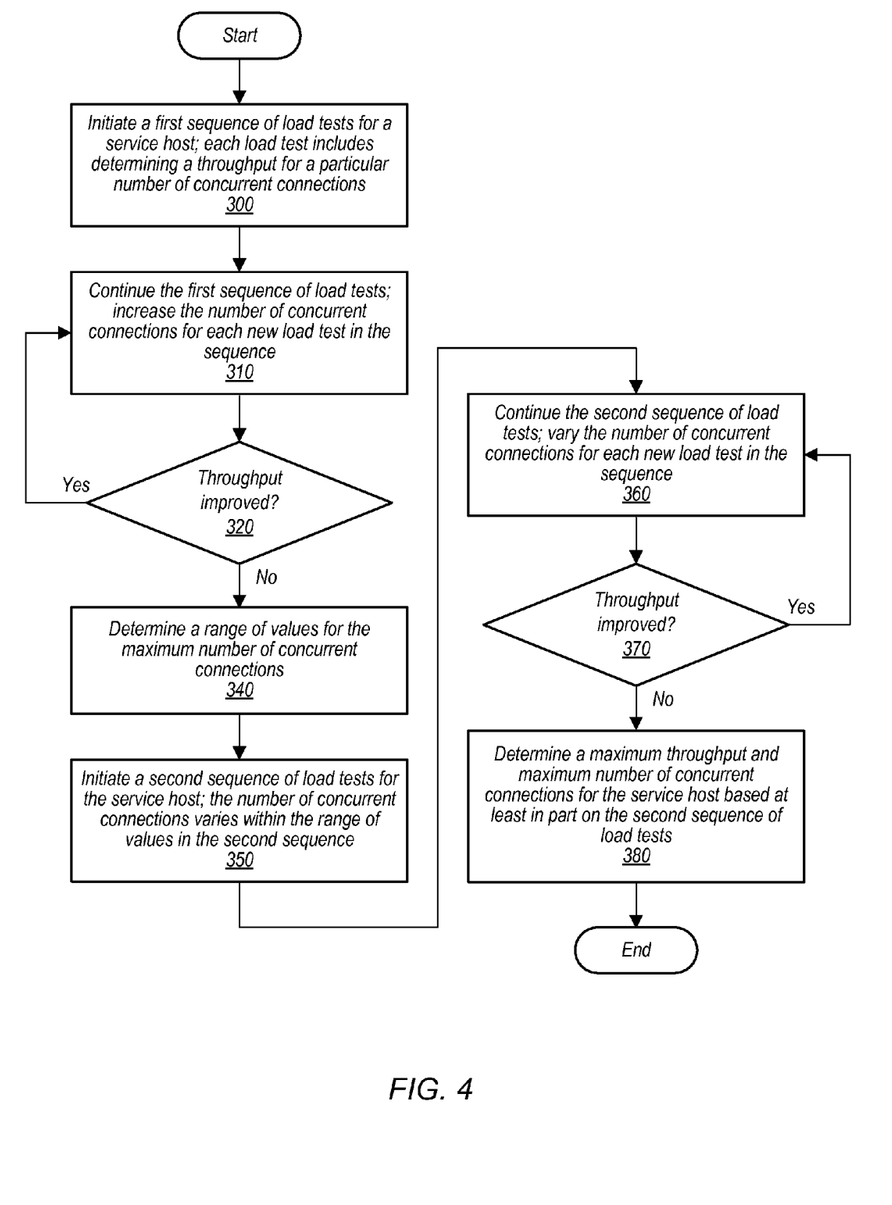
FIG. 4 is a flowchart illustrating further aspects of the method for automated determination of maximum service throughput, including a first sequence and second sequence of load tests, according to one embodiment.

FIG. 4 is a flowchart illustrating further aspects of the method for automated determination of maximum service throughput, including a first sequence and second sequence of load tests, according to one embodiment. As shown in 300, a first sequence of load tests may be initiated for a service host (e.g., a host that implements a particular service). Each load test may include applying load to the service for a period of time using a particular number of concurrent connections to the service, e.g., by sending service requests to the service. The load test may determine one or more performance metrics of the service host and/or service, such as throughput. The throughput may be measured as the number of successful transactions processed by the service per unit of time (e.g., per second). Any suitable technique(s) may be used to determine the throughput or other metrics, such as analysis of the responses from the service. The conditions that determine the success or failure of a transaction may be configurable by a user. The operation shown in 300 may represent at least one load test or iteration using an initial number of concurrent connections.

As shown in 310, the first sequence of load tests may continue with one or more additional load tests or iterations. The number of concurrent connections may be increased from load test to load test or iteration to iteration. In one embodiment, the number of concurrent connections may be increased nonlinearly in the first sequence. For example, the number of concurrent connections may be doubled from load test to load test or iteration to iteration. Again, each load test may include applying load to the service for a period of time using a particular number of concurrent connections to the service and determining the throughput achieved by the service for the particular number of concurrent connections. Accordingly, the operation shown in 310 may represent at least one load test using a number of concurrent connections greater than that of the previous load test.

As shown in 320, it may be determined whether the throughput achieved in the most recent load test or iteration represents an improvement over the throughput achieved in the previous load test or iteration, i.e., in comparison to the load test or iteration immediately preceding the most recent one. If the throughput was improved, then the method may continue with another load test or iteration at a higher number of concurrent connections, as shown in 310. If the throughput was the same or decreased, then the first sequence of load tests may be discontinued or halted. In one embodiment, it may be determined whether the latest throughput metric represents an improvement by a particular predetermined threshold, such as a percentage increase. For example, if the threshold is a 3% improvement, then the first sequence of load tests may be discontinued if the most recent load test represents only a 2% improvement in throughput.

As shown in 340, a range of values for the estimated maximum number of concurrent connections may be determined. The range of values may be determined based at least in part on the first sequence of load tests. In one embodiment, the upper boundary of the range may be the number of concurrent connections used in the final load test of the first sequence. In one embodiment, the upper boundary of the range may be the number of concurrent connections used in the antepenultimate load test of the first sequence, i.e., the next-to-next-to-last load test. In other words, if the final load test is the Nth iteration, then the upper boundary of the range may be based on the number of concurrent connections in the Nth iteration, while the lower boundary of the range may be based on the number of concurrent connections in the (N−2)th iteration.

As shown in 350, a second sequence of load tests may be initiated for the service host. In the second sequence, the number of concurrent connections may vary within the range of values determined in the operation shown in 340. The number of concurrent connections may vary within this range from load test to load test or iteration to iteration. The second sequence of load tests may represent a search within the range of values for the estimated maximum throughput. Each load test in the second sequence may include applying load to the service for a period of time using a particular number of concurrent connections to the service, e.g., by sending service requests to the service. The load test may determine one or more performance metrics of the service host and/or service, such as throughput. The throughput may be measured as the number of successful transactions processed by the service per unit of time (e.g., per second). Any suitable technique(s) may be used to determine the throughput or other metrics, such as analysis of the responses from the service. The conditions that determine the success or failure of a transaction may be configurable by a user. The operation shown in 350 may represent at least one load test or iteration using an initial number of concurrent connections.

As shown in 360, the second sequence of load tests may continue with one or more additional load tests or iterations. The number of concurrent connections may be changed from load test to load test or iteration to iteration, either by increasing or decreasing the number. In one embodiment, the second sequence may represent a binary search within the range of values for the number of concurrent connections. In one embodiment, the second sequence may represent a search for the estimated maximum throughput (and corresponding number of concurrent connections) in logarithmic time. Again, each load test may include applying load to the service for a period of time using a particular number of concurrent connections to the service and determining the throughput achieved by the service for the particular number of concurrent connections. Accordingly, the operation shown in 360 may represent at least one load test using a number of concurrent connections greater than or less than that of the previous load test.

As shown in 370, it may be determined whether the throughput achieved in the most recent load test or iteration represents an improvement over the throughput achieved in the previous load test or iteration, i.e., in comparison to the load test or iteration immediately preceding the most recent one. If the throughput was improved, then the method may continue with another load test or iteration at a different number of concurrent connections, as shown in 360. If the throughput was the same or decreased, then the first sequence of load tests may be discontinued or halted. In one embodiment, it may be determined whether the latest throughput metric represents an improvement by a particular predetermined threshold, such as a percentage increase. For example, if the threshold is a 3% improvement, then the second sequence of load tests may be discontinued if the most recent load test represents only a 2% improvement in throughput.

As shown in 380, aspects of the optimized configuration of the service may be determined after the second sequence of load tests is finished. For example, the estimated maximum throughput of the service may be determined, e.g., based at least in part on the second sequence of load tests (and indirectly on the first sequence of load tests). The estimated maximum number of concurrent connections that the service can handle may also be determined. In one embodiment, the estimated maximum number of concurrent connections may be determined as the number of concurrent connections used in the load test having the estimated maximum throughput.

Figure 5:
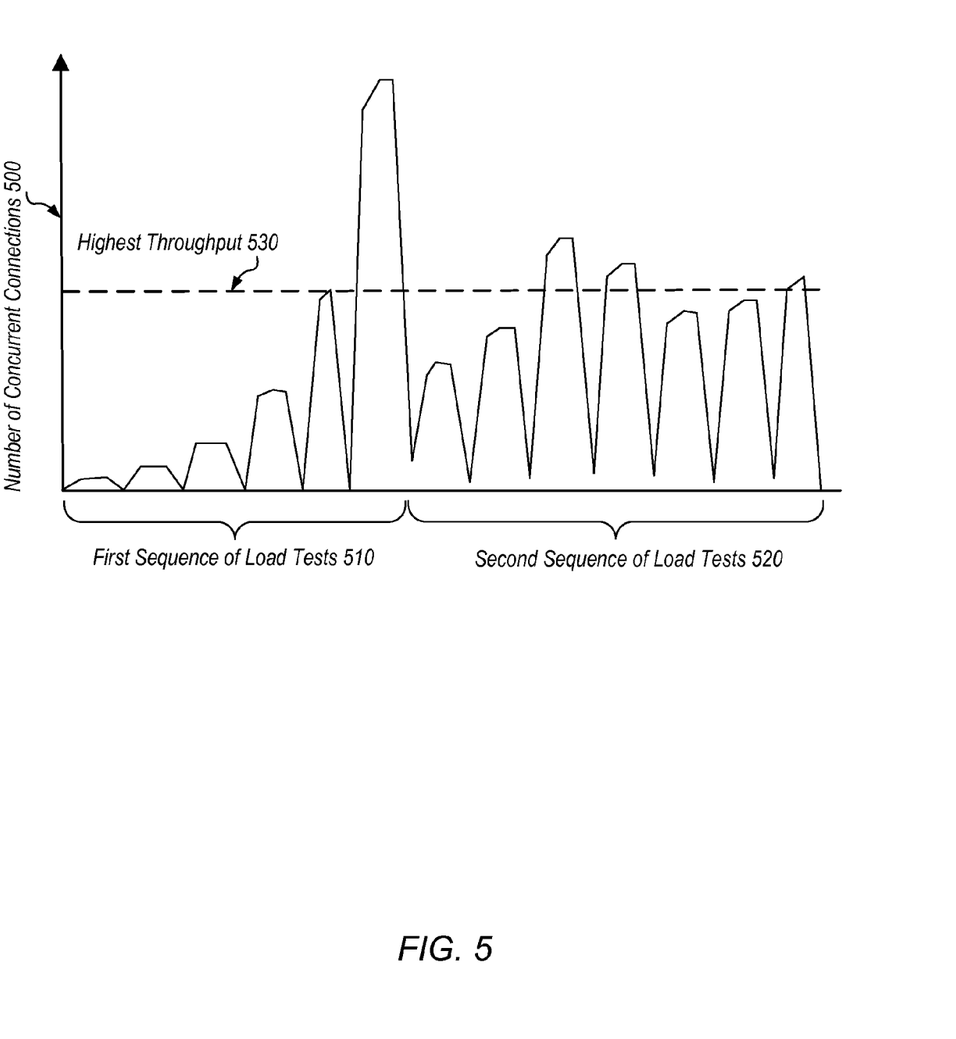
FIG. 5 is a graph illustrating an example of results obtained using automated determination of maximum service throughput, according to one embodiment.

FIG. 5 is a graph illustrating an example of results obtained using automated determination of maximum service throughput, according to one embodiment. They axis may represent the number of concurrent connections 500 used for particular load tests. The x axis may represent time, including a first sequence of load tests 510 followed by a second sequence of load tests 520. In the example of FIG. 5, the number of concurrent connections may begin with a suitably low value, such as 1. For each successive load test in the first sequence, the number of concurrent connections may be doubled: e.g., 1, 2, 4, 8, 16, 32. For each load test, the throughput of the service may be determined. As shown in the example of FIG. 5, the first sequence of load tests may be terminated after the load test that uses 32 concurrent connections, when the throughput is no longer improved in comparison to the previous load test that uses 16 concurrent connections. The second sequence of load tests may then be performed to search within the range of values between 8 and 32 for the number of concurrent connections. The second sequence of load tests may be terminated when a suitably high throughput is found for load tests ranging between 8 and 32 concurrent connections. Accordingly, the maximum throughput determined for the service (for a corresponding number of concurrent connections) may be an approximation of the highest throughput 530.

Figure 6:
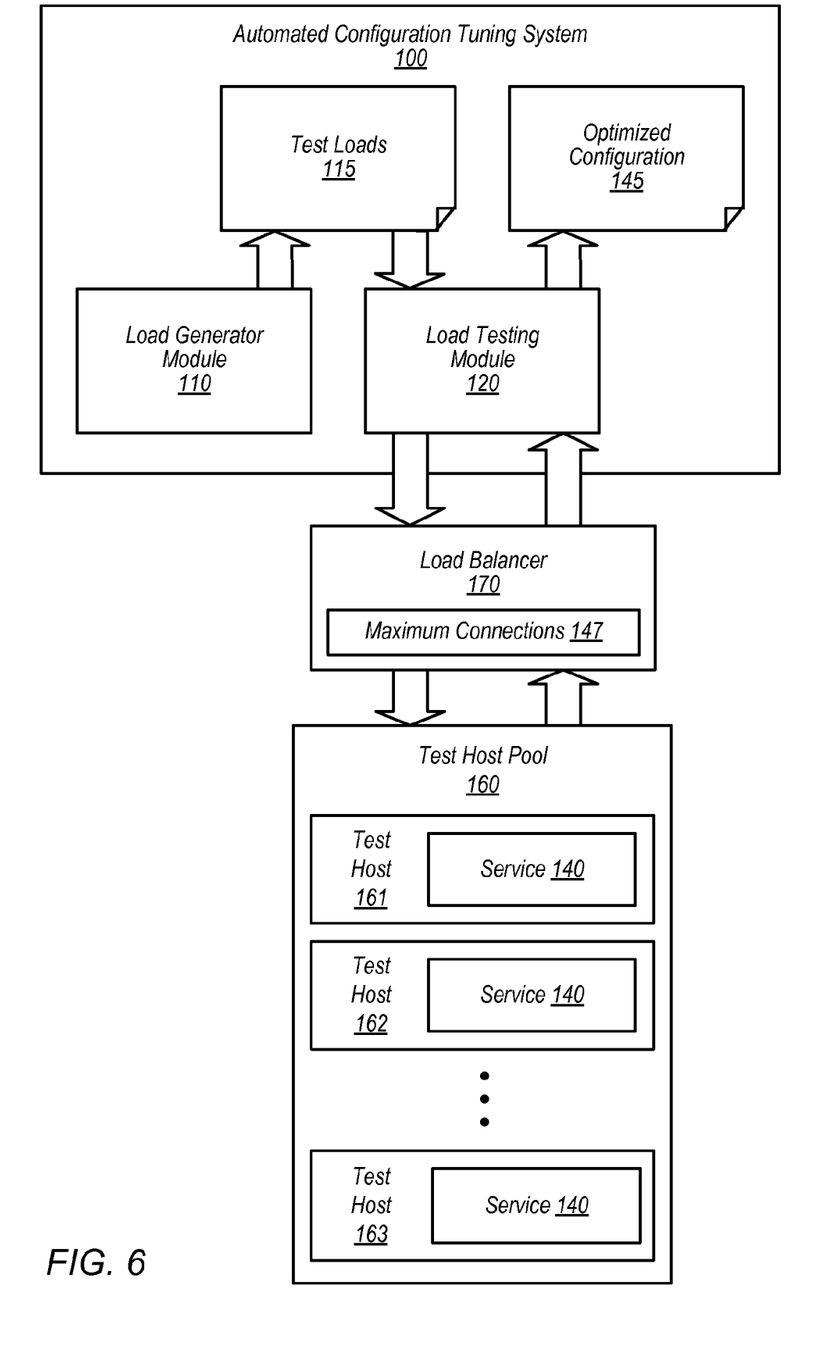
FIG. 6 illustrates an example system environment for automated determination of maximum service throughput, including multiple test hosts, according to one embodiment.

FIG. 6 illustrates an example system environment for automated determination of maximum service throughput, including multiple test hosts, according to one embodiment. In one embodiment, automated tuning techniques similar to those discussed above may be used with a plurality of test hosts. As shown in FIG. 6, the automated configuration tuning system 100 may be communicatively coupled to a plurality of other computer systems, any of which may be implemented by the example computing device 3000 illustrated in FIG. 7, over one or more networks. The automated configuration tuning system 100 may be communicatively coupled to a test host pool 160 comprising a plurality of test computer systems. For purposes of illustration, the test host pool 160 is depicted in FIG. 1 as including three test hosts 161, 162, and 163. However, it is contemplated that any suitable number of test hosts may be used. Software implementing the service 140 may be installed on, and executed by, each of the test hosts 161, 162, and 163.

In one embodiment, the load testing module 120 may determine the optimal configuration 145 by testing a single test host. In one embodiment, the load testing module 120 may validate the optimal configuration 145 by performing additional load tests on a plurality of test hosts 161, 162, and/or 163. The additional load tests may determine whether the optimal configuration 145 is scalable from one host to many hosts. In one embodiment, the load testing module 120 may first test one host then test increasing numbers of hosts to determine the maximum throughput (and corresponding number of concurrent connections) of a fleet of hosts. For example, the load testing module may perform a sequence of load tests in which the number of hosts increases. In one embodiment, the number of hosts may increase nonlinearly, e.g., by doubling the number of hosts with each successive iteration.

In one embodiment, a fleet of hosts that implement the service 140 may sit behind a load balancer 170 that directs requests to individual hosts. The value estimated for the maximum connections may be used to optimize the configuration of the load balancer 170 for a fleet of service hosts, including the test host pool 160. In one embodiment, the "maximum connections" parameter of the load balancer may be assigned the value for the maximum connections 147 as determined by the load testing module 120. In one embodiment, the fleet of test hosts 160 may be subjected to load tests to validate the value for the maximum connections 147 as determined by the load testing module 120. In one embodiment, the fleet of test hosts 160 may be subjected to load tests in which the maximum connections parameter for the load balancer 170 varies within a range of values, e.g., a range including the estimated maximum as determined by the load testing module 120. In this manner, the optimized configuration 145 determined by the load testing module 120 for a single host may be validated and/or refined for a set of test hosts.

Illustrative Computer System

In at least some embodiments, a computer system that implements a portion or all of one or more of the technologies described herein may include a general-purpose computer system that includes or is configured to access one or more computer-readable media. FIG. 7 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices configured to implement an automated configuration tuning system, wherein the automated configuration tuning system is configured to:
   perform a first set of load tests for a service host across a plurality of iterations, comprising a first iteration and one or more additional iterations, wherein, for the first iteration of the first set of load tests, the automated configuration tuning system is configured to
   provide load to the service host using a first number of concurrent connections to the service host; and
   determine, for the first number of concurrent connections to the service host, a corresponding number of successful transactions per second processed by the service host;
   wherein, for the one or more additional iterations of the first set of load tests, the automated configuration tuning system is configured to:
   provide load to the service host using a current number of concurrent connections to the service host at a current one of the additional iterations, wherein the current number of concurrent connections is greater than a number of concurrent connections at a previous one of the iterations;
   determine, for the current number of concurrent connections to the service host at the current one of the additional iterations, a corresponding number of successful transactions per second processed by the service host; and
   discontinue the first set of load tests when the number of successful transactions per second at the current iteration is not greater by a particular threshold than the number of successful transactions per second at the previous one of the iterations;
   determine, based at least in part on the first set of load tests, a range of values for an optimal number of concurrent connections to the service host, wherein an upper boundary of the range of values is determined based at least in part on a number of concurrent connections to the service host at a final one of the additional iterations;
   perform a second set of load tests for the service host across a plurality of further iterations, wherein a number of concurrent connections to the service host varies within the range of values across the plurality of further iterations; and
   determine, based at least in part on the second set of load tests, the optimal number of concurrent connections to the service host, wherein the optimal number of concurrent connections provides a highest number of successful transactions per second processed by the service host among the plurality of further iterations.

2. The system as recited in claim 1, wherein the number of concurrent connections to the service host is doubled from particular ones of the iterations to next ones of the iterations in the first set of load tests.

3. The system as recited in claim 1, wherein the automated configuration tuning system is further configured to:
   determine an optimized number of service hosts in a fleet based at least in part on the highest number of successful transactions per second and an expected peak throughput; and
   provision one or more additional service hosts or deprovision one or more existing service hosts based on the optimized number of service hosts, wherein the provisioning or deprovisioning is performed using automated scaling.

4. The system as recited in claim 1, wherein the automated configuration tuning system is further configured to:
   configure a maximum connections parameter of a load balancer for the service host with the optimal number of concurrent connections.

5. A computer-implemented method, comprising:
   initiating a first sequence of load tests for a service host, wherein individual ones of the load tests in the first sequence comprise determining a first respective throughput at the service host for a first respective number of concurrent connections to the service host, and wherein the first respective number of concurrent connections to the service host increases nonlinearly in at least a portion of the first sequence of load tests;
   discontinuing the first sequence of load tests when throughput is not increased by a predetermined threshold from a particular one of the load tests in the first sequence to a next one of the load tests in the first sequence;
   performing a second sequence of load tests for the service host, wherein individual ones of the load tests in the second sequence comprise determining a second respective throughput at the service host for a second respective number of concurrent connections to the service host, wherein the second respective number of concurrent connections to the service host varies within a range of values based at least in part on the first sequence of load tests; and
   determining an estimated maximum throughput for the service host based at least in part on the second sequence of load tests, wherein the estimated maximum throughput corresponds to a particular number of concurrent connections to the service host.

6. The method as recited in claim 5, wherein the number of concurrent connections to the service host is doubled from individual ones of the load tests to next ones of the load tests in the first sequence.

7. The method as recited in claim 5, wherein performing the second sequence of load tests for the service host further comprises:
performing a binary search within the range of values for the first number of concurrent connections to the service host.

8. The method as recited in claim 5, further comprising:
determining an optimized number of service hosts in a fleet based at least in part on the estimated maximum throughput and an expected peak throughput; and
provisioning one or more additional service hosts or deprovisioning one or more existing service hosts based on the optimized number of service hosts, wherein the provisioning or deprovisioning is performed using automated scaling.

9. The method as recited in claim 5, further comprising:
configuring a maximum connections parameter of a load balancer for the service host with the particular number of concurrent connections corresponding to the estimated maximum throughput for the service host.

10. The method as recited in claim 5, wherein the first sequence of load tests for the service host is initiated automatically in response to a change in program code for a service implemented by the service host.

11. The method as recited in claim 5, further comprising:
repeating the first sequence of load tests for a plurality of service hosts; and
determining an estimated maximum throughput for the plurality of service hosts based at least in part on the first sequence of load tests for the plurality of service hosts, wherein the estimated maximum throughput for the plurality of service hosts corresponds to a particular number of concurrent connections to the plurality of service hosts.

12. A non-transitory computer-readable storage medium storing program instructions computer-executable to perform:
initiating a first sequence of load tests for a service host, wherein individual ones of the load tests in the first sequence comprise determining a first respective throughput at the service host for a first respective number of concurrent connections to the service host, and wherein the first respective number of concurrent connections to the service host increases nonlinearly in at least a portion of the first sequence of load tests;
terminating the first sequence of load tests when throughput is not increased by a particular threshold from a particular one of the load tests in the first sequence to a next one of the load tests in the first sequence;
initiating a second sequence of load tests for the service host, wherein individual ones of the load tests in the second sequence comprise determining a second respective throughput at the service host for a second respective number of concurrent connections to the service host, wherein the second respective number of concurrent connections to the service host varies within a range of values based at least in part on the first sequence of load tests; and
estimating a maximum throughput for the service host based at least in part on the second sequence of load tests, wherein the maximum throughput corresponds to a particular number of concurrent connections to the service host.

13. The non-transitory computer-readable storage medium as recited in claim 12, wherein the number of concurrent connections to the service host is doubled from individual ones of the load tests to next ones of the load tests in the first sequence.

14. The non-transitory computer-readable storage medium as recited in claim 12, wherein performing the second sequence of load tests for the service host further comprises:
performing a binary search within the range of values for the first number of concurrent connections to the service host.

15. The non-transitory computer-readable storage medium as recited in claim 12, wherein the program instructions are further computer-executable to perform:
determining an optimized number of service hosts in a fleet based at least in part on the maximum throughput and an expected peak throughput; and
provisioning one or more additional service hosts or deprovisioning one or more existing service hosts based on the optimized number of service hosts, wherein the provisioning or deprovisioning is performed using automated scaling.

16. The non-transitory computer-readable storage medium as recited in claim 12, wherein the program instructions are further computer-executable to perform:
configuring a maximum connections parameter of a load balancer for the service host with the particular number of concurrent connections corresponding to the maximum throughput for the service host.

17. The non-transitory computer-readable storage medium as recited in claim 12, wherein the first sequence of load tests for the service host is initiated automatically in response to a change in program code for a service implemented by the service host.

18. The non-transitory computer-readable storage medium as recited in claim 12, wherein the program instructions are further computer-executable to perform:
repeating the first sequence of load tests for a plurality of service hosts; and
estimating a maximum throughput for the plurality of service hosts based at least in part on the first sequence of load tests for the plurality of service hosts, wherein the maximum throughput for the plurality of service hosts corresponds to a particular number of concurrent connections to the plurality of service hosts.

* * * * *